United States Patent
Ji

(10) Patent No.: US 7,897,076 B2
(45) Date of Patent: Mar. 1, 2011

(54) METHOD TO PRODUCE CONDUCTIVE TRANSFER ROLLER, TRANSFER ROLLER, AND IMAGE FORMING APPARATUS HAVING THE SAME

(75) Inventor: Young-phil Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 11/955,611

(22) Filed: Dec. 13, 2007

(65) Prior Publication Data

US 2009/0011350 A1 Jan. 8, 2009

(30) Foreign Application Priority Data

Jul. 2, 2007 (KR) .................. 10-2007-0066247

(51) Int. Cl.
- B25F 5/02 (2006.01)
- B29C 44/00 (2006.01)
- G03G 15/14 (2006.01)
- G03G 15/01 (2006.01)
- G03G 5/00 (2006.01)

(52) U.S. Cl. .............. 264/51; 264/46.6; 264/46.7; 264/105; 524/505

(58) Field of Classification Search .......... 264/46.1, 264/46.4, 46.7, 105; 524/505
See application file for complete search history.

(56) References Cited

U.S. PATENT DOCUMENTS

| | | | |
|---|---|---|---|
| 3,298,884 A * | 1/1967 | Willy | 156/79 |
| 3,635,847 A * | 1/1972 | Evans et al. | 521/136 |
| 4,333,484 A * | 6/1982 | Keritsis | 131/359 |
| 4,559,003 A * | 12/1985 | Poncet | 425/224 |
| 6,283,903 B1 * | 9/2001 | Onuki et al. | 492/56 |
| 6,465,144 B1 * | 10/2002 | Hashimoto et al. | 430/106.1 |
| 6,582,222 B1 * | 6/2003 | Chen et al. | 432/60 |
| 6,873,816 B2 * | 3/2005 | Akashi et al. | 399/286 |
| 7,187,890 B2 * | 3/2007 | Nishida | 399/179 |
| 7,609,999 B2 * | 10/2009 | Gila et al. | 399/176 |
| 7,744,781 B2 * | 6/2010 | Tajima et al. | 252/519.33 |
| 2002/0136567 A1 * | 9/2002 | Haraguchi et al. | 399/149 |
| 2004/0147383 A1 * | 7/2004 | Uesaka et al. | 492/56 |
| 2004/0230011 A1 * | 11/2004 | Hattori et al. | 525/343 |
| 2005/0029693 A1 * | 2/2005 | Noda et al. | 264/46.9 |
| 2007/0021548 A1 * | 1/2007 | Hattori et al. | 524/505 |
| 2007/0258737 A1 * | 11/2007 | Ogiyama et al. | 399/315 |
| 2008/0281027 A1 * | 11/2008 | Hattori et al. | 524/424 |
| 2010/0129464 A1 * | 5/2010 | Suzuki | 424/600 |
| 2010/0150602 A1 * | 6/2010 | Sano et al. | 399/101 |

(Continued)

FOREIGN PATENT DOCUMENTS

JP 11065269 A * 5/1999

Primary Examiner—Joseph S Del Sole
Assistant Examiner—Nahida Sultana
(74) Attorney, Agent, or Firm—Stanzione & Kim, LLP

(57) ABSTRACT

A method to produce a conductive transfer roller, and the transfer roller. The method to produce the conductive transfer roller includes adding and mixing a conductive substance, an ionic conductive agent, a vulcanizing agent, and a blowing agent and at least one of elastic materials selected from a group consisting of EPMD (ethylene propylene) rubber, NBR (acrylonitrile butadiene) rubber, ECO (epichlorohydrin ethylene oxide) rubber, and CR (chloroprene rubber), extruding the compound, blowing the extruded material by passing it through a continuous mobile foaming device, pressing the foam onto a shaft and applying a secondary curing, and grinding the foam to a desired thickness.

14 Claims, 3 Drawing Sheets

U.S. PATENT DOCUMENTS

2010/0150606 A1* 6/2010 Tamoto et al. .............. 399/111
2010/0158579 A1* 6/2010 Kusano et al. .............. 399/279
2010/0196630 A1* 8/2010 Murakami et al. ....... 428/32.39

* cited by examiner

METHOD TO PRODUCE CONDUCTIVE TRANSFER ROLLER, TRANSFER ROLLER, AND IMAGE FORMING APPARATUS HAVING THE SAME

CROSS-REFERENCE TO RELATED APPLICATIONS

This application claims the benefit under 35 U.S.C. §119(a) from Korean Patent Application No. 10-2007-0066247, filed on Jul. 2, 2007, in the Korean Intellectual Property Office, the entire disclosure of which is incorporated herein by reference in its entirety.

BACKGROUND OF THE INVENTION

1. Field of the Invention

The present general inventive concept relates generally to a method to produce a transfer roller used in an image forming apparatus and the transfer roller. More particularly, the present general inventive concept relates to a method to produce a conductive transfer roller by passing through a continuous mobile oven foaming device. The produced conductive transfer roller is applicable to image forming apparatuses using electro photography, such as printers, copiers, and fax machines.

2. Description of the Related Art

FIG. 1 illustrates a conventional image forming apparatus 1. The image forming apparatus 1 includes a photoconductive member (a photoconductive drum 8), a charging means 4, an exposing means (not illustrated), a toner supply means 3 to supply toner 6, and a developing means 2 to form a transferable image from image data. A toner image is fused on a surface of a transfer medium (for example, a printing medium) to form a permanent image.

Typically, a conventional rotating contact transfer roller 5 is widely used as a means to transfer the toner image from the photoconductive drum 8. The conventional rotating contact transfer roller 5 can not only simplify the delivery path of the transfer medium but also stabilize the transfer medium delivery. The conventional transfer roller 5 is disposed in contact with the photoconductive drum 8. A nip part of the transfer medium and a transfer point are formed in the contact surface between the conventional transfer roller 5 and the photoconductive drum 8. When a voltage is applied to the conventional transfer roller 5, the transfer medium is delivered through the transfer point and the toner image on the photoconductive drum 8 is electrostatically transferred onto the transfer medium. To charge the photoconductive drum 8 and the transfer medium, the conventional transfer roller 5 should be electrically conductive.

As discussed above, to make the toners of the photoconductive drum 8 achieve enough transferring effect, the contact surface between the photoconductive drum 8 and the conventional transfer roller 5 should be kept constant. For doing so, the conventional transfer rollers currently in use are formed of a rubbery elastic roller. Mostly, the rubbery material includes ethylene propylene (EPDM) rubber, acrylonitrile butadiene (NBR) rubber, silicon, and urethane rubber. Preferably, the rubbery material has low hardness to enhance close contact with the drum 8.

The conventional transfer roller 5 is classified as an ionic conductive type and an electron conductive type. The electron conductive type features the stable resistance according to its environment. However, it is quite hard to regulate the amount of carbon to adjust the resistance in the production. Since a shaft (not illustrated) of the conventional transfer roller 5 is pressed with an elastic layer, the elastic layer is likely to deform. The non-uniform electric resistance makes it hard to acquire the uniform electronic conductivity. The ionic conductive type does not suffer the non-uniform resistance even when the elastic layer is deformed. However, its severe resistance change according to the environment requires high voltage. The photoconductive drum 8 may be contaminated because of the leakage of a charging control material added in the production of the conventional transfer roller 5.

A conventional transfer roller producing method produces a rubber composite which mixes a polymer with a vulcanizing agent, a blowing agent, and a filler, in the form of an unvulcanized tube using a mold or an extruder. Next, the unvulcanized tube is vulcanized and blown with heated air to produce a foaming rubber tube. The foaming rubber tube is pressed to the shaft spread with adhesives, and the intended external diameter is ground.

The vulcanized foaming method for articles extruded from an unvulcanized tube includes a mold forming vulcanization using a general press, a direct/indirect vulcanization using a vulcanizing pipe, and a hot wind vulcanization. However, it is hard to transfer the uniform heat to the rubber material and to acquire the uniform foam in the mold forming vulcanization or the hot wind vulcanization. Thus, a vapor vulcanization using the vulcanizing pipe is generally used. However, the vapor vulcanization is a batch production method. Since the vapor vulcanization cuts the rubber tube produced from the extruder at a certain part and then vulcanizes and foams the cut rubber tube, the uniform heat is hardly transferred in the longitudinal direction of the rubber tube and a foam line may be formed in the longitudinal direction.

SUMMARY OF THE INVENTION

The present general inventive concept provides an improved method to produce a conductive transfer roller of an ionic conductive type and an electron conductive type using a continuous mobile foaming method to apply the conductivity. The conductive transfer roller of the present general inventive concept achieves a stable and uniform foam structure by applying the continuous mobile foaming method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to produce a conductive transfer roller including adding and mixing a conductive substance, an ionic conductive agent, a vulcanizing agent, and a blowing agent and at least one of an elastic material selected from a group consisting of EPMD (ethylene propylene) rubber, NBR (acrylonitrile butadiene) rubber, ECO (epichlorohydrin ethylene oxide) rubber, and CR (chloroprene rubber) to form a compound, extruding the compound, blowing the extruded compound by passing the extruded compound through a continuous mobile foaming device to form a foam, pressing the foam onto a shaft and applying a secondary curing, and grinding the foam to a predetermined thickness.

The elastic material may be a compound of NBR and ECO and a ratio of the NBR to the ECO may be from 65:35 through 90:10 by weight.

The ionic conductive agent may be selected from a group consisting of ammonium salt, perchlorate, chlorate, hydrochloride, bromate, oxy salt, fluoboric acid, sulfate, ethylsulfate, carbonate, and sulfonate and the ionic conductive agent is added to be from 0.1~0.5% by weight based on a weight of the total compound.

The conductive substance may be carbon black, and the conductive substance may be added to be from 0.5~1.5% by weight based on a weight of the total compound.

The vulcanizing agent may be sulfur or organic sulfur compound, and the vulcanizing agent may be added to be from 1~3% by weight based on a weight of the total compound.

The blowing agent may be azodicarbonamide, and the blowing agent may be added to be from 2~10 phr.

The method may further include adding at least one of additive selected from a group consisting of vulcanization accelerator, filler, anti-aging agent, vulcanization promoter, and blowing promoter.

The extruding operation may be performed at a temperature of from 20~70° C. and having an extruder turning at from 100~300 RPM.

The extruding operation may be followed immediately by a continuous mobile foaming device to form the foam.

An internal temperature of the continuous mobile foaming device may be maintained at from 200~250° C.

A length of the continuous mobile foaming device which performs the foaming operation may be from 10~30 m in length of foaming operation.

The foregoing and/or other aspects and utilities of the present general inventive concept may also be achieved by providing a conductive transfer roller produced from a mixture including at least one elastic material selected from a group consisting of EPMD (ethylene propylene) rubber, NBR (acrylonitrile butadiene) rubber, ECO (epichlorohydrin ethylene oxide) rubber, and CR (chloroprene rubber), and including a conductive agent, an ionic conductive agent, a vulcanizing agent, and a blowing agent, and having a resistance of from $10^6$~$10^{10}\Omega$ and a hardness of from 30~50 (Asker "c").

The foregoing and/or other aspects and utilities of the present general inventive concept may also be achieved by providing a method of manufacturing a conductive transfer roller of an image forming apparatus, including mixing carbon black, an ammonium salt compound as an ionic conductive agent, a vulcanizing agent, and a blowing agent and at least one of an elastic material selected from a group consisting of EPMD (ethylene propylene) rubber, NBR (acrylonitrile butadiene) rubber, ECO (epichlorohydrin ethylene oxide) rubber, and CR (chloroprene rubber) to form a compound, extruding the compound, blowing the extruded compound by passing the extruded compound through a continuous mobile foaming device to form a foam, pressing the foam onto a shaft and applying a secondary curing, and grinding the foam to a predetermined thickness.

The elastic material may be a compound of NBR and ECO and a ratio of the NBR to the ECO may be from 65:35 through 90:10 by weight.

The vulcanizing agent may be sulfur which may be added to the mixing to be from 1~3% by weight based on a weight of the total compound.

The method may also include adding to the mixing at least one additive selected from a group consisting of vulcanization accelerator, filler, anti-aging agent, vulcanization promoter, and blowing promoter.

The extruding operation may be performed at a temperature of from 20~70° C. and having an extruder turning at from 100~300 RPM.

A length of the continuous mobile foaming device which performs the foaming operation may be from 10~30 m in length of foaming operation.

The conductive transfer roller may be single-layered.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
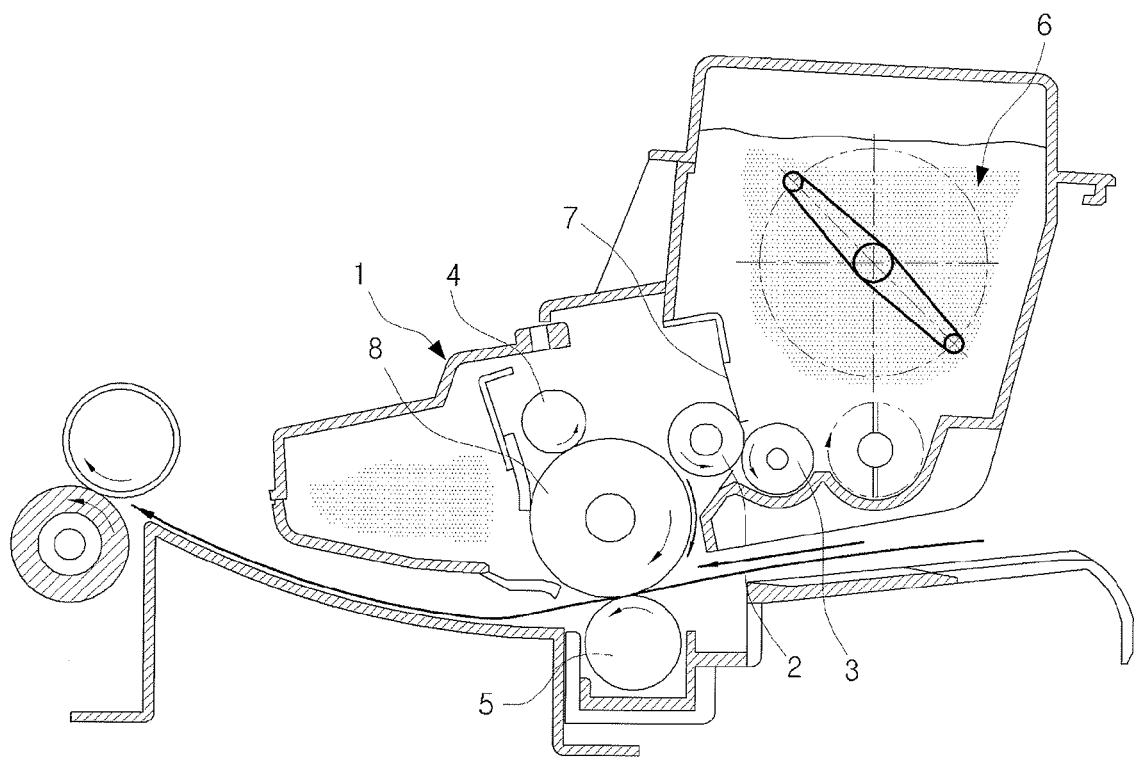
FIG. 1 illustrates a conventional image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
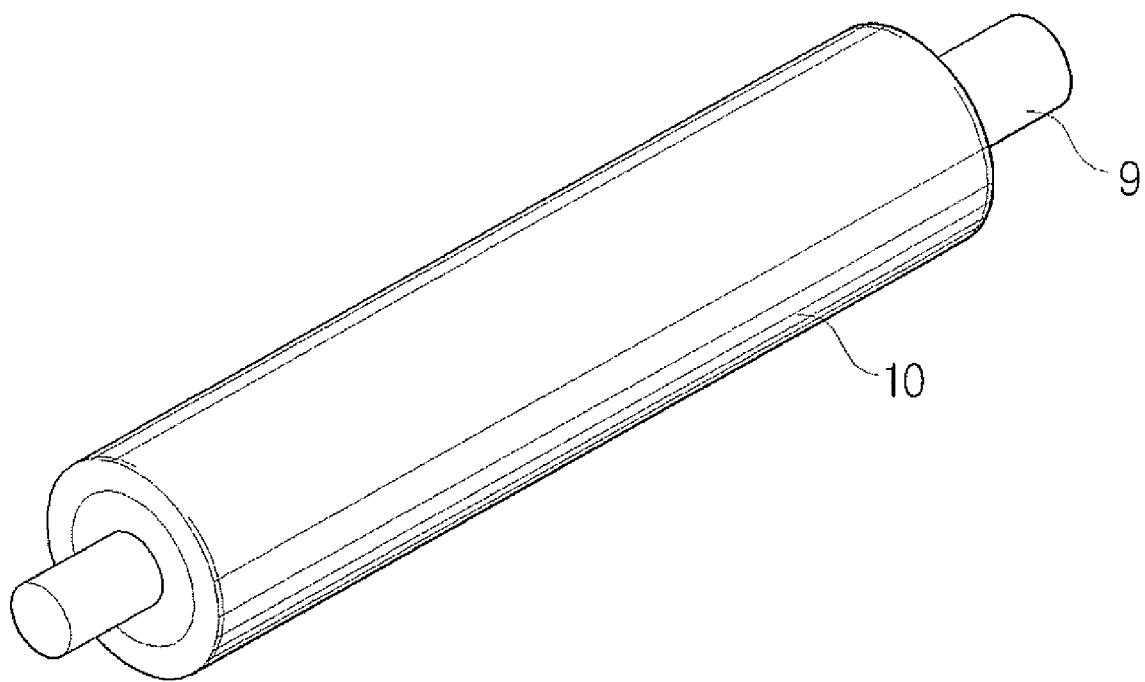
FIG. 2 illustrates a perspective view of a transfer roller and shaft according to an embodiment of the present general inventive concept.

A conductive transfer roller 10 (refer to FIG. 2) according to an embodiment of the present general inventive concept is produced by mixing at least one of elastic materials selected from a group consisting of EPMD (ethylene propylene) rubber, NBR (acrylonitrile butadiene) rubber, ECO (epichlorohydrin ethylene oxide) rubber, and CR (chloroprene rubber) and adding a conductive material, an ionic conductive agent, a vulcanizing agent, and a cross-linking agent, extruding the mixture to form articles (refer to FIG. 3), foaming extruded articles by passing through a continuous mobile foaming device, pressing the foam to a shaft 9 and applying a secondary curing, and grinding the foam to a predetermined thickness.

The elastic material used for the conductive transfer roller 10 includes at least one of elastic materials selected from the group consisting of EPDM (ethylene propylene) rubber, NBR (acrylonitrile butadiene) rubber, ECO (epichlorohydrin ethylene oxide) rubber, and CR (chloroprene rubber). It is preferable in one embodiment to employ a mixture of NBR and ECO. In this case, preferably, the ratio of NBR to ECO is from 65:35 through 90:10 by weight. When the proportion of NBR to ECO exceeds 90, the efficiency of the final conductive transfer roller 10 deteriorates. When the proportion of NBR to ECO falls below 65, the resistance stability and the elasticity of the final conductive transfer roller 10 deteriorate.

The ionic conductive agent added to the mixture to produce the conductive transfer roller 10 can be selected from the group consisting of, but not limited to, ammonium salt, perchlorate, chlorate, hydrochloride, bromate, oxy salt, fluoboric acid, sulfate, ethylsulfate, carbonate, and sulfonate. In addition, the group may consist of perchlorate, chlorate, hydrochloride, bromate, oxy salt, fluoboric acid, sulfate, ethylsulfate, carbonate, and sulfonate containing alkali metals such as lithium, sodium, potassium, calcium, and magnesium, or alkaline earth metals. For example, the ammonium salt includes tetraethylammonium, tetrabutylammonium, lauryltrimethylammonium, decyltrimethylammonium, octadecyltrimethylammonium, stearyltrimethylammonium, benzyltrimethylammonium, and demethylethylammonium. The preferable ionic conductive agent used for the conductive transfer roller 10 in one embodiment is ammonium salt. The ionic conductive agent is added and mixed in a small amount to be from 0.1~0.5% by weight based on the total compound weight. When the ionic conductive agent below 0.1% by weight is added, the resistance stability of the transfer roller 10 based on the environment deteriorates to lower the efficiency. When the ionic conductive substance over 0.5% by weight is added, an image contamination or image defect can be caused.

The conductive material used to produce the conductive transfer roller 10 includes, but is not limited to, conductive carbon black such as acetylene black and ketjen black, oxidized ink carbon, thermal carbon, natural graphite, artificial graphite, conductive metallic oxide such as tin oxide, titanium dioxide, zinc oxide, silver, nickel, copper, germanium, and gold. The carbon black is preferable in one embodiment. Preferably, the conductive carbon black has a small average diameter having a structure with a large surface area. The conductive material used to produce the conductive transfer roller 10 is added to be from 0.5~1.5% by weight based on the total compound weight. When the conductive material below 0.5% by weight is added, the resistance efficiency of the transfer roller 10 deteriorates. When the conductive material over 1.5% by weight is added, an image defect is caused.

In the production of the conductive transfer roller 10, the vulcanizing agent added to the elastic substance includes, but is not limited to, selenium, tellurium, sulfur, and sulfur compounds containing an organic compound, for example, sulfur chloride. The sulfur is preferable in one embodiment. The amount of the added vulcanizing agent is from 1~3% by weight based on the total compound weight. When the proportion of the vulcanizing agent falls below 1% by weight, the cross-linking is incomplete. When the proportion of the vulcanizing agent exceeds 3% by weight, the hardness of the transfer roller 10 becomes extremely high.

In the production of the conductive transfer roller 10, the blowing agent added to the elastic substance can be, but is not limited to, a blowing agent selected from the group consisting of inorganic blowing agents often used in the chemical blowing method, such as azo-compounds, nitrone compounds, and OSBH compounds (oxy bis(benzene sulfonyl hydrazide)). According to an embodiment of the present general inventive concept, azodicarbonamide (ADCA) is most preferable. The amount of the added blowing agent is not limited, but 2~10 parts per hundred of rubber (phr) is added to the raw elastic substance. When the amount of the blowing agent is below 2 phr, the foaming is deficient and the hardness is increased because of the small amount of gas. When the amount of the blowing agent exceeds 10 phr, the great amount of gas lowers the hardness and vulnerability to compression and causes an image defect.

Other additives to the compound can include vulcanization accelerator, filler such as talc, calcium carbonate or clay, silicon dioxide, anti-aging agent, vulcanization promoter, and blowing promoter. Any additives known in the art can be added.

The compound, including the ionic conductive agent, the conductive material, the vulcanizing agent, and the blowing agent is mixed with the elastic material using the kneader, is formed in a form of sheet, is ripened at a room temperature over 24 hours, and then is put into an extruder. The condition of the extruder 18 (refer to FIG. 3) is, but is not limited to, the temperature of from 20~70° C. and an extruder screw (not illustrated) turning from 100~300 RPM. Preferably, in one embodiment, the temperature of the screw is from 20~40° C. and a head temperature of the extruder 18 is from 40~70° C. with the screw turning from 100~300 RPM.

Figure 3:
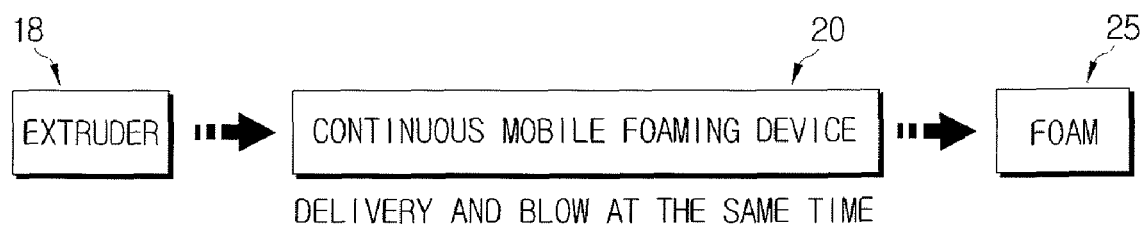
FIG. 3 is a simplified flow diagram illustrating a method to produce a conductive transfer roller using a continuous mobile foaming oven according to an embodiment of the present general inventive concept.

Next, foaming is performed by delivering and passing articles extruded from extruder 18 through the continuous mobile foaming device 20, or a continuous moving foaming device, connected to the extruder 18 as illustrated in FIG. 3. Preferably, the internal temperature of the continuous mobile foaming device 20 is, but is not limited to, of from 200~250° C. When the temperature falls below 200° C., the foaming becomes insufficient and the foaming structure becomes unstable which causes problems in the resistance uniformity and the cell forming. When the temperature exceeds 250° C., the cell forming and the resistance cause an image defect of the produced transfer roller 10. The continuous mobile foaming device 20 may be any device that receives a material and continuously moves the material along a path while causing the material to foam.

The length of the continuous mobile foaming device 20 is from about 10~30 m. A length below 10 m causes the unstable foaming structure and decreases the resistance stability. A length over 30 m causes the excessive foaming and the unstable hardness. Preferably in one embodiment, the time taken for the mixture to pass through the mobile foaming device 20 is, but is not limited to, from about 5 minutes to 1 hour.

The continuous mobile foaming device 20 used for the foaming process can be manufactured using a well-known method or purchased from a manufacturer.

The foam 25 produced by the continuous mobile foaming device 20 is pressed in a molding frame. In doing so, preferably in one embodiment, the molding frame is a rubber tube. The pressed foam is forcibly pressed to the shaft 9 (refer to FIG. 2) of conductive transfer roller 10 without adhesives, is cured for the second time, and is grounded to an intended, predetermined external diameter to thus produce the final product. The operations performed after the pressing can be carried out according to a conventional process.

The conductive transfer roller 10 produced according to the present inventive concept as above described, is single-layered. Its hardness ranges from about 30~50 as measured using an Asker C durometer having a 1 kg load, and its electrical resistance ranges from about $10^6$~$10^{10}\Omega$.

The conductive transfer roller 10 achieves good inner diameter accuracy or good forming uniformity, and is cost effective by minimizing discards from the cut rubber tube. By adopting the continuous mobile foaming method described above, rather than the conventional foaming method, the conductive transfer roller 10 of the present general inventive concept acquires the stable and uniform resistance and the stability of the foaming structure. However, the conventional method requires artificial manipulation to adjust the uniform resistance, whereas the present general inventive concept reduces the processes without manipulation.

Now, examples of the present general inventive concept are described in further detail, but the present general inventive concept is not limited to these examples.

EXAMPLES

Ingredients were Mixed According to the Ratios of Table 1 and Test Samples were Produced

TABLE 1

| Substance | Example 1 | Example 2 | Example 3 | Comparison 1 | Comparison 2 |
|---|---|---|---|---|---|
| NBR | 80 | 80 | 80 | 80 | 80 |
| ECO | 20 | 20 | 20 | 20 | 20 |
| calcium carbonate | 20 | 20 | 20 | 20 | 20 |
| carbon black | 10 | 9 | 8.5 | 10 | 5.5 |
| sulfur | 1.5 | 1.5 | 1.5 | 1.5 | 1.5 |
| conductive carbon black | 1 | 1.2 | 1.5 | — | 4.5 |
| ionic conductive agent | 0.5 | 0.3 | 0.2 | 2.5 | — |
| stearic acid | 1 | 1 | 1 | 1 | 1 |
| zinc oxide | 5 | 5 | 5 | 5 | 5 |
| blowing agent (ADCA) | 4 | 4 | 4 | 4 | 4 |
| urea | 1 | 1 | 1 | 1 | 1 |
| anti-aging agent | 0.5 | 0.5 | 0.5 | 0.5 | 0.5 |
| vulcanization accelerator | 1 | 1 | 1 | 1 | 1 |
| foaming method | continuous foaming | continuous foaming | continuous foaming | vulcanizing pipe foaming | vulcanizing pipe foaming |
| adhesives | none | none | none | apply adhesives | apply adhesives |

Using the samples produced according to Examples 1, 2 and 3 using the present general inventive concept and according to Comparisons 1 and 2 using a conventional process, the drum contamination, the hardness, the electrical resistance, the foaming shape, and the uniformity were assessed as illustrated in Table 2.

Figure 4:
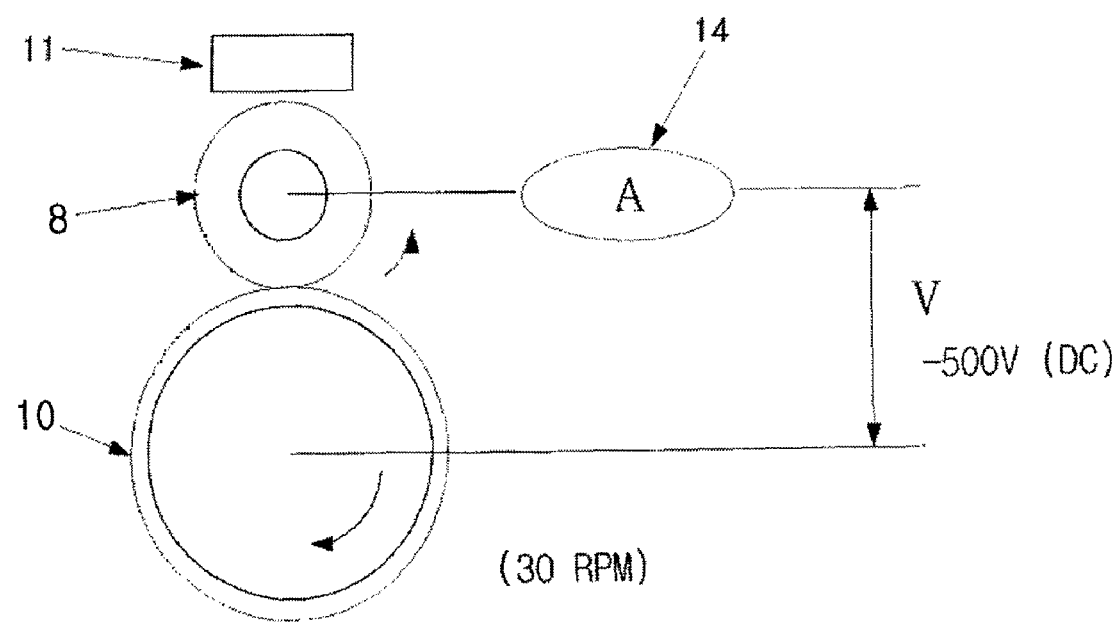
FIG. 4 is a simplified diagram illustrating a measurer used to measure a resistance of a transfer roller in accordance with the present general inventive concept.

Drum contamination assessment: the transfer roller 10 was put in contact with the surface of a photoconductive drum 8 (refer to FIG. 4) by forming a nip of about 0.2~0.4 mm and placed at a temperature of 30° C. with 80% humidity for six days. After placed at room temperature for one day, the photoconductive drum 10 is mounted to a developer means 11 to output an image, thus checking for any image defect.

Hardness assessment: A JIG durometer was used with the load at 500 G. An Asker C type durometer was used. The measurement was taken three seconds after the durometer, at a certain position, fell with the load of 500 G on the JIG and contacted the roller 10 surface (the measurement was executed at a temperature of 23° C. and 55% humidity 55% after 8 hours).

Resistance measurement: the roller 10 used for the measurement was mounted in the JIG and the weight of 500 g was put on the roller 10. The current was measured with an amp meter 14 by applying a DC voltage of −500V to the roller shaft 9 and rotating the transfer roller 10 at a constant speed (30 rpm). The current value was converted to a resistance value (refer to FIG. 4) using the following formula.

Resistance measurement:resistance($R$)=voltage($V$)/current($I$)

Foaming shape assessment: the uniformity and the continuity of foam cell shapes were assessed with the naked eye. To ensure assessment reliability, a scanning electron microscope (SEM) device was used.

TABLE 2

|  | Example 1 | Example 2 | Example 3 | Comparison 1 | Comparison 2 |
|---|---|---|---|---|---|
| Drum contamination | A | A | G | N | G |
| Hardness (Asker "c") | 35~38 | 38~40 | 38~40 | 42~44 | 43~46 |
| Electrical resistance | 128 MΩ | 115 MΩ | 108 MΩ | 95 MΩ | 92 MΩ |
| Foam shape and uniformity | G | E | E | G | G |

Results:
E: Excellent,
G: Good,
A: Acceptable,
N: Not good

As illustrated in Table 2, Examples 1, 2 and 3, which were produced using the continuous mobile foaming device 20 according to the present general inventive concept, have a stable foaming structure and good resistance uniformity. By contrast, Comparison 1, which is the ionic conductive compound, has bad drum contamination. Also, Comparison 2, which is the electron conductive compound, has no problem with the foam shape or the drum contamination but there might be resistance variations according to the production lot.

Samples were produced and assessed to measure the internal temperature of the foaming device 20. The compound of Example 3 in Table 1 was used for the assessment, and the same assessment as described above was executed.

TABLE 3

|  | Comparison 3 | Example 4 | Example 5 | Example 6 | Comparison 4 |
| --- | --- | --- | --- | --- | --- |
| Internal temperature (° C.) | 180 | 210 | 230 | 240 | 260 |
| Drum contamination | A | G | E | G | N |
| Hardness (Asker "c") | 34~37 | 36~38 | 37~39 | 38~40 | 42~45 |
| Electric resistance | 132 MΩ | 121 MΩ | 108 MΩ | 110 MΩ | 94 MΩ |
| Foam shape and uniformity | N | G | G | G | N |

Results:
E: Excellent,
G: Good,
A: Acceptable,
N: Not good

As illustrated in Table 3, the sample of Comparison 3, which used a conventional process, has an unstable foam structure and the sample of Comparison 4, which also used a conventional process, illustrates inferior drum contamination. By contrast, the samples of Example 4, 5 and 6 which were made according to the present general inventive concept have stable foam structure and suffer no drum contamination.

The conductive transfer roller according to the present general inventive concept achieves good inner diameter accuracy or good foam uniformity. The conductive transfer roller is cost effective by minimizing discards from the cut rubber tube. By adopting the continuous mobile foaming method rather than the conventional foaming method, the stabilized and uniform resistance and the stabilized foam structure is acquired. Further, while the conventional method requires artificial manipulation to adjust the uniform resistance, the present general inventive concept reduces the processes without manipulation.

Although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method to produce a conductive transfer roller, comprising:

adding and mixing a conductive substance, an ionic conductive agent, a vulcanizing agent, and a blowing agent and at least one of an elastic material selected from a group consisting of EPMD (ethylene propylene) rubber, NBR (acrylonitrile butadiene) rubber, ECO (epichlorohydrin ethylene oxide) rubber, and CR (chloroprene rubber) to form a compound;

extruding the compound;

blowing the extruded compound by passing the extruded compound through a continuous moving foaming device to form a foam, the continuous moving foaming device having an internal temperature maintained in a range from approximately 200~250° C.;

pressing the foam onto a shaft and applying a secondary curing; and grinding the foam to a predetermined thickness, wherein the ionic conductive agent is selected from a group consisting of ammonium salt, perchlorate, chlorate, hydrochloride, bromate, oxy salt, fluoboric acid, sulfate, ethylsulfate, carbonate, and sulfonate and the ionic conductive agent is added to be from approximately 0.1~0.5% by weight based on a weight of the total compound, and the conductive substance is carbon black and the conductive substance is added to be from approximately 0.5~1.5% by weight based on a weight of the total compound.

2. The method of claim 1, wherein the elastic material is a compound of NBR and ECO and a ratio of the NBR to the ECO is from approximately 65:35 through approximately 90:10 by weight.

3. The method of claim 1, wherein the vulcanizing agent is sulfur or an organic sulfur compound and the vulcanizing agent is added to be from approximately 1~3% by weight based on a weight of the total compound.

4. The method of claim 1, wherein the blowing agent is azodicarbonamide and the blowing agent is added to be from approximately 2~10 phr.

5. The method of claim 1, further comprising:

adding at least one additive selected from a group consisting of vulcanization accelerator, filler, anti-aging agent, vulcanization promoter, and blowing promoter.

6. The method of claim 1, wherein the extruding operation is performed at a temperature of from approximately 20~70° C. and an extruder turns at a rate of approximately 100~300 RPM.

7. The method of claim 1, wherein the extruding operation is followed immediately by a continuous moving foaming device to form the foam.

8. The method of claim 1, wherein a length of the continuous moving foaming device which performs the foaming operation is from approximately 10~30 m in length of foaming operation.

9. A method of manufacturing a conductive transfer roller of an image forming apparatus, comprising:

mixing carbon black, an ammonium salt compound as an ionic conductive agent, a vulcanizing agent, and a blowing agent and at least one of an elastic material selected from a group consisting of EPMD (ethylene propylene) rubber, NBR (acrylonitrile butadiene) rubber, ECO (epichlorohydrin ethylene oxide) rubber, and CR (chloroprene rubber) to form a compound;

extruding the compound;

blowing the extruded compound by passing the extruded compound through a continuous moving foaming device to form a foam, the continuous moving foaming device having an internal temperature maintained in a range from approximately 200~250° C.;

pressing the foam onto a shaft and applying a secondary curing; and grinding the foam to a predetermined thickness, wherein the ionic conductive agent is added to be from approximately 0.1~0.5% by weight based on a weight of the total compound, and the carbon black is mixed to be from approximately 0.5~1.5% by weight based on a weight of the total compound.

10. The method of claim 9, wherein the elastic material is a compound of NBR and ECO and a ratio of the NBR to the ECO is from approximately 65:35 through approximately 90:10 by weight.

11. The method of claim 9, wherein the vulcanizing agent is sulfur which is added to the mixing to be from approximately 1~3% by weight based on a weight of the total compound.

12. The method of claim 9, further comprising:
adding to the mixing at least one additive selected from a group consisting of vulcanization accelerator, filler, anti-aging agent, vulcanization promoter, and blowing promoter.

13. The method of claim 9, wherein the extruding operation is performed at a temperature of from approximately 20~70° C. and an extruder turns at a rate of approximately 100~300 RPM.

14. The method of claim 9, wherein a length of the continuous moving foaming device which performs the foaming operation is from approximately 10~30 m in length of foaming operation.

* * * * *